United States Patent
Tsuda et al.

(10) Patent No.: US 8,672,493 B2
(45) Date of Patent: Mar. 18, 2014

(54) DISPLAY DEVICE AND OPTICAL FILM

(75) Inventors: Kazuhiko Tsuda, Osaka (JP); Takao Imaoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 168 days.

(21) Appl. No.: 13/138,684

(22) PCT Filed: Mar. 29, 2010

(86) PCT No.: PCT/JP2010/055558
§ 371 (c)(1),
(2), (4) Date: Sep. 19, 2011

(87) PCT Pub. No.: WO2010/113868
PCT Pub. Date: Oct. 7, 2010

(65) Prior Publication Data
US 2012/0008213 A1    Jan. 12, 2012

(30) Foreign Application Priority Data
Mar. 30, 2009   (JP) .................................. 2009-083202

(51) Int. Cl.
*G02B 27/00* (2006.01)

(52) U.S. Cl.
USPC .......................................... 359/601; 359/609

(58) Field of Classification Search
USPC ................................................ 359/896, 601
See application file for complete search history.

(56) References Cited

U.S. PATENT DOCUMENTS

| | | | |
|---|---|---|---|
| 2002/0044356 A1 | 4/2002 | Arakawa et al. | |
| 2006/0050387 A1 | 3/2006 | Arakawa et al. | |
| 2006/0228592 A1* | 10/2006 | Stover et al. | 428/910 |
| 2008/0032058 A1 | 2/2008 | Arakawa et al. | |
| 2010/0284087 A1 | 11/2010 | Yamada et al. | |

FOREIGN PATENT DOCUMENTS

| | | |
|---|---|---|
| JP | 10-054981 A | 2/1998 |
| JP | 2001-264520 A | 9/2001 |
| WO | WO-2009-110139 A1 | 9/2009 |

OTHER PUBLICATIONS

International Search Report.

* cited by examiner

*Primary Examiner* — Jade R Chwasz
(74) *Attorney, Agent, or Firm* — Harness, Dickey & Pierce, P.L.C.

(57) ABSTRACT

A display device and an optical film are disclosed which can protect the moth-eye structure while maintaining low reflectance. A display device is provided, which comprises an anti-reflection film including a moth-eye structure and a peelable protective film, wherein the protective film covers the moth-eye structure and is attached to a flat portion of the display device, the flat portion being flatter than the moth-eye structure. The flat portion suitably corresponds to the substrate and/or a region free of the moth-eye structure on the anti-reflection film, in a display panel.

7 Claims, 13 Drawing Sheets

Fig. 1
(a)
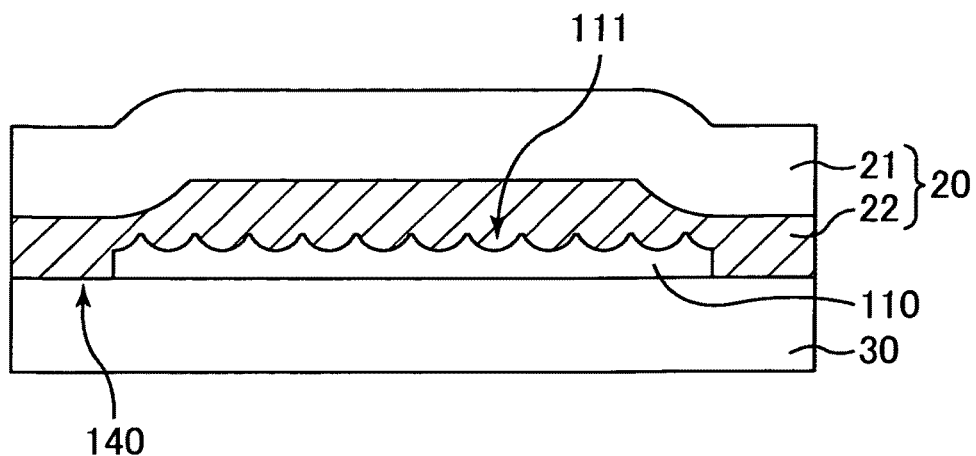
(b)
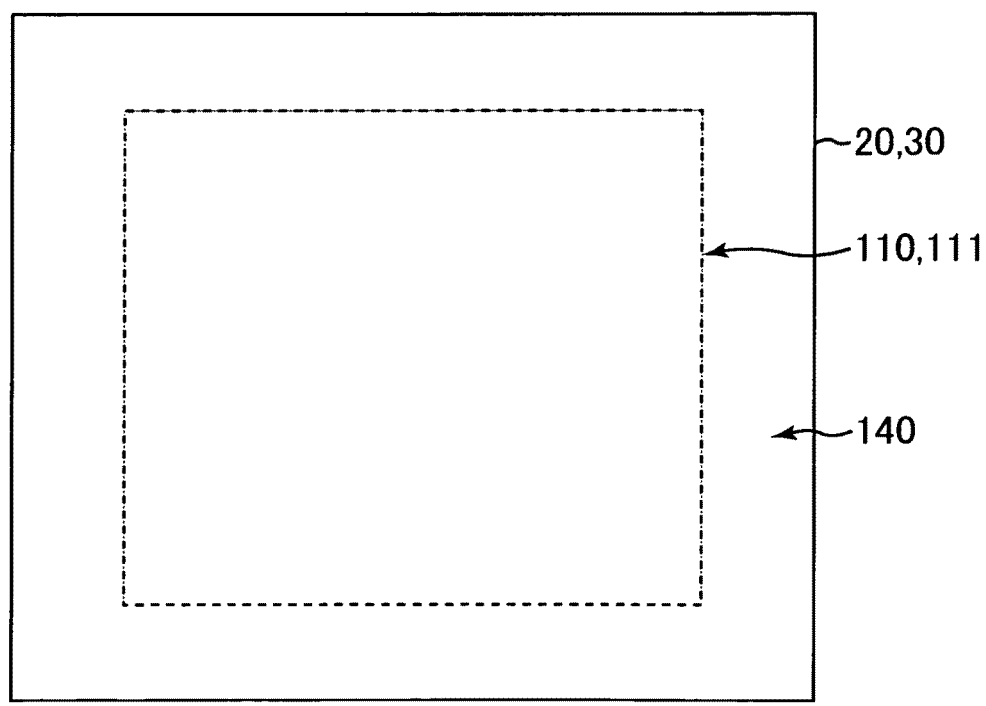

Fig. 2
(a)
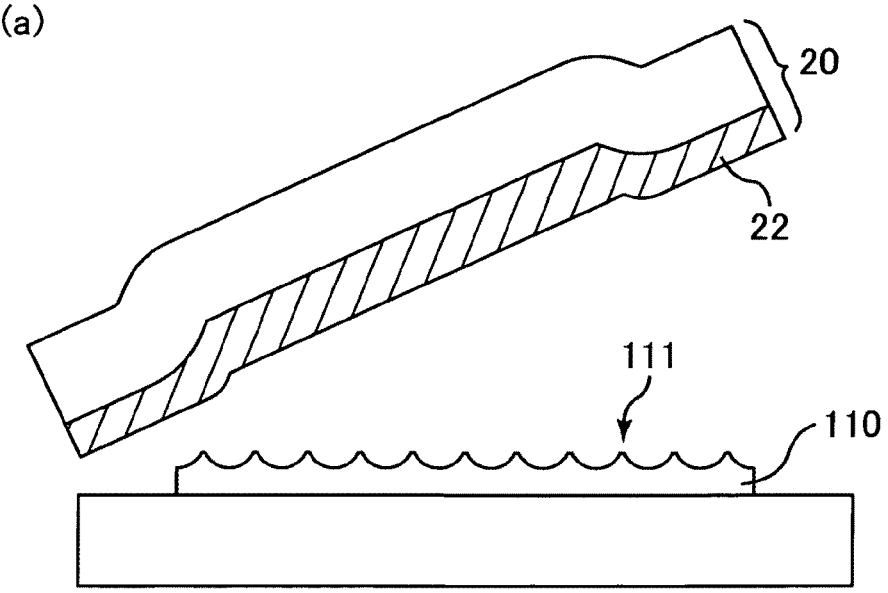
(b)
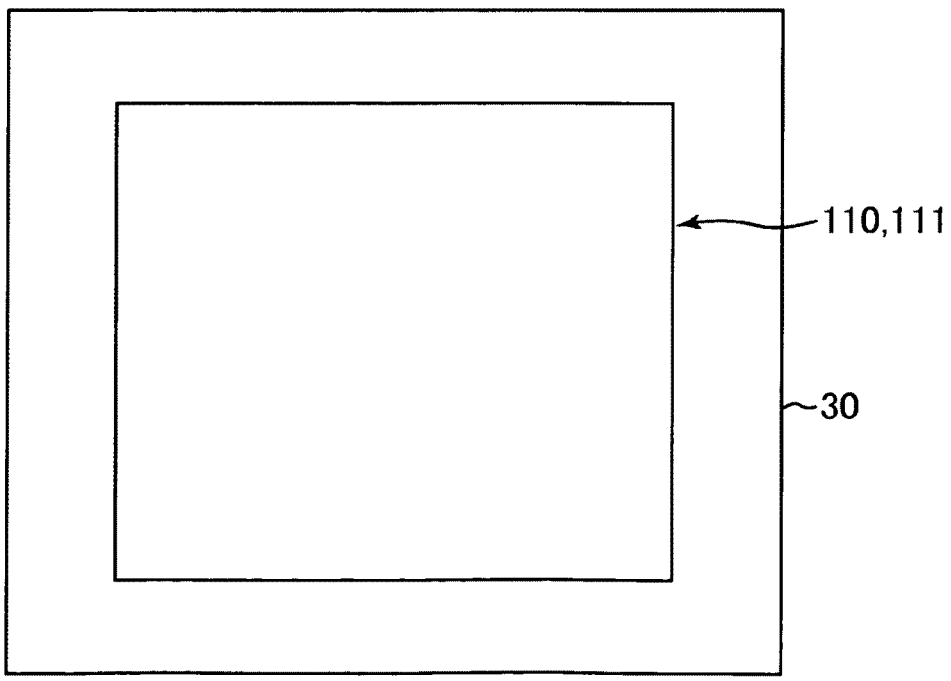

Fig. 3
(a)
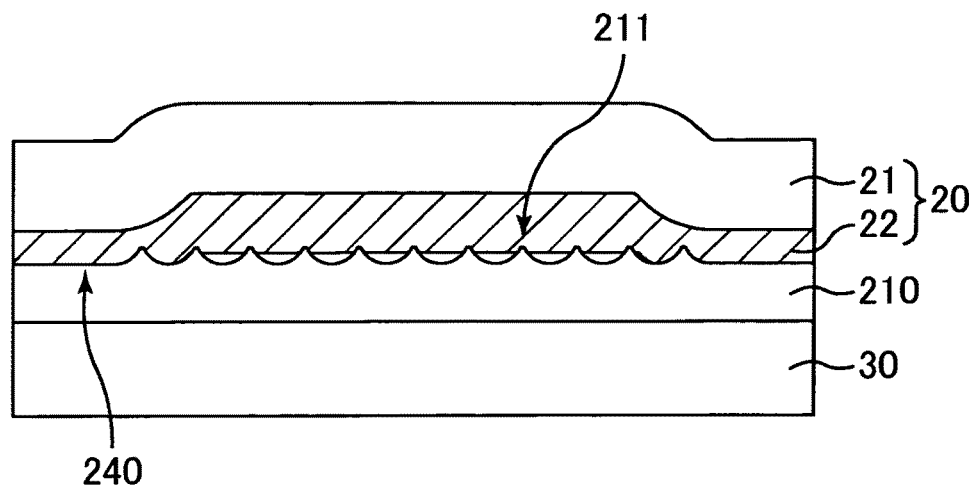
(b)
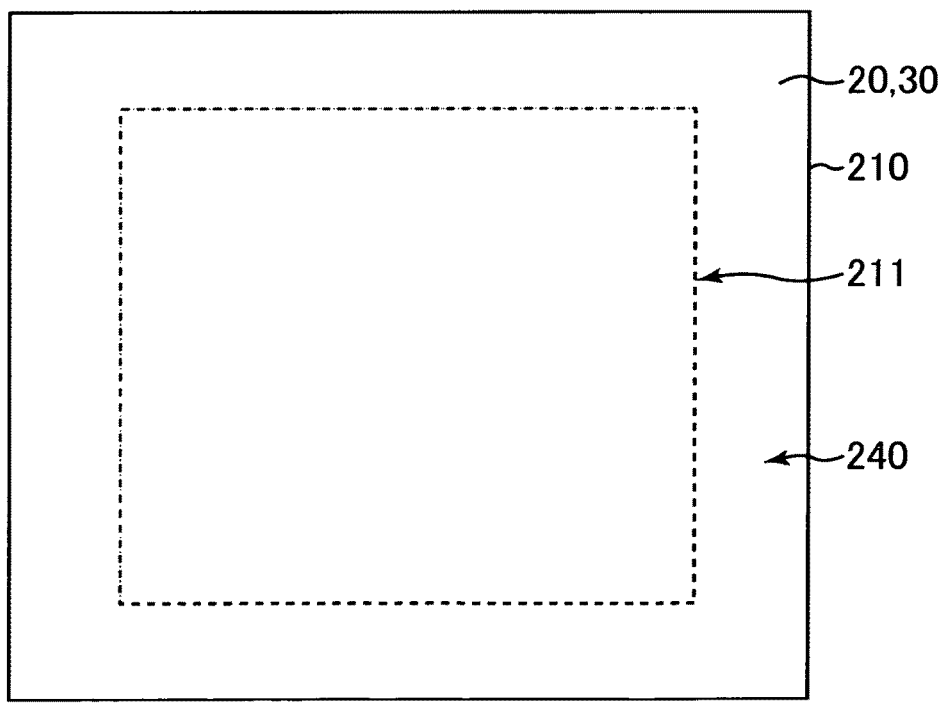

Fig. 4
(a)
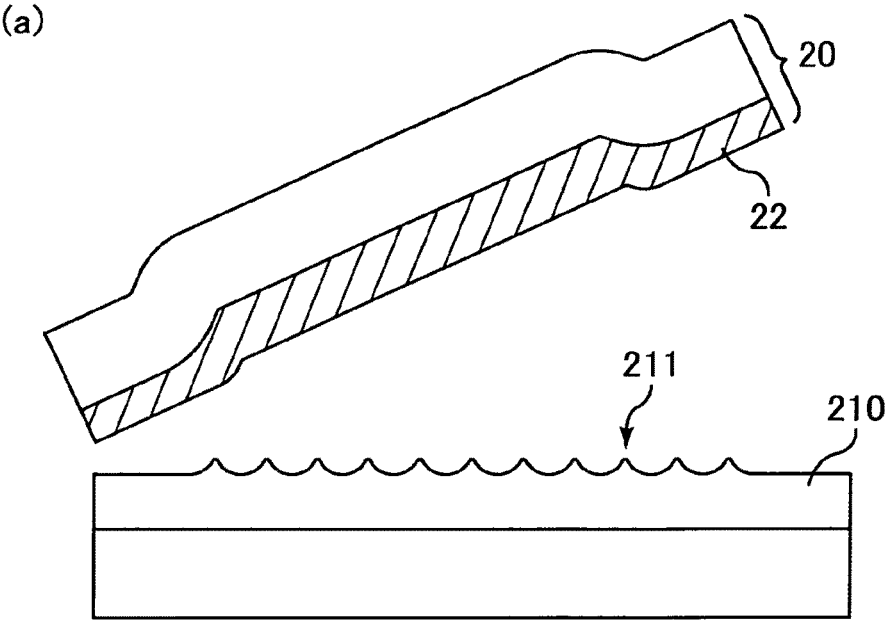
(b)
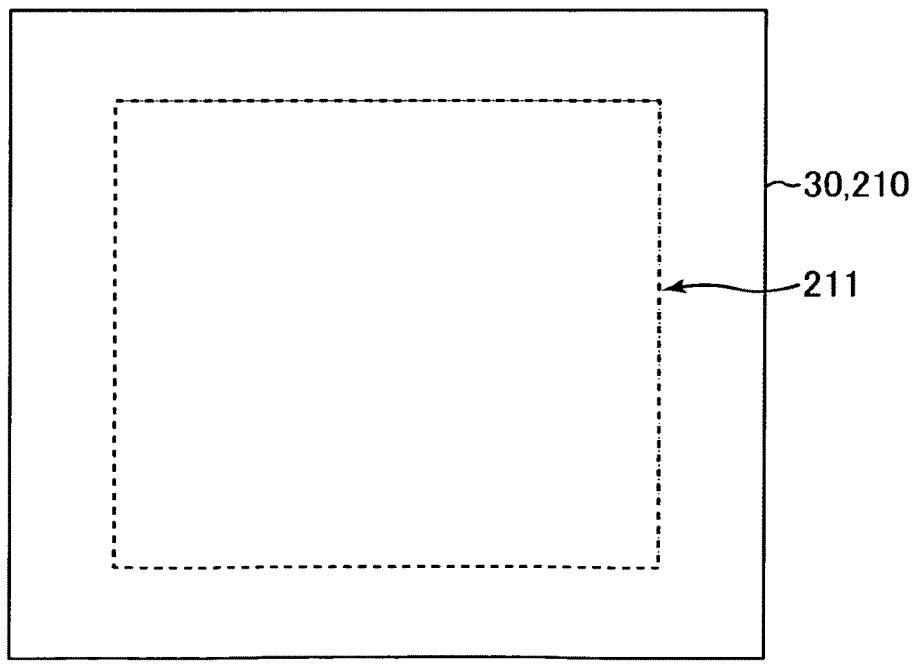

350

311

Fig. 9
(a)
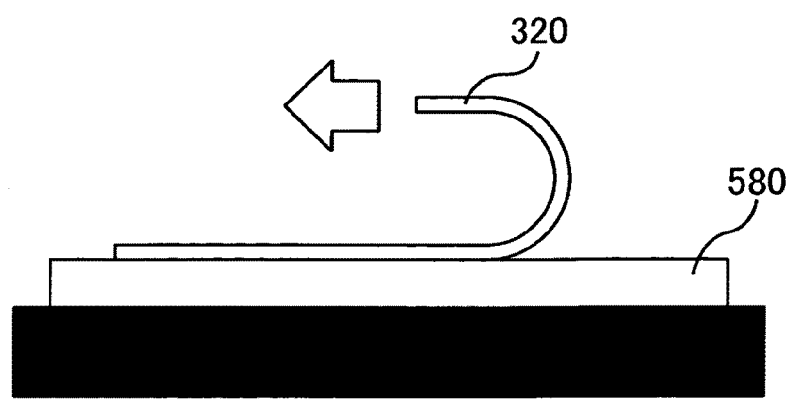
(b)
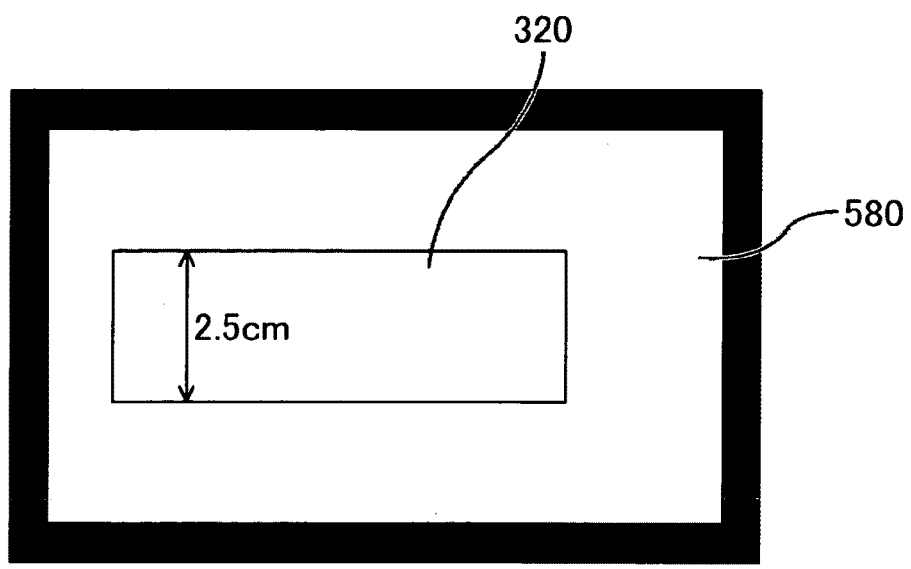

Fig. 10
(a)
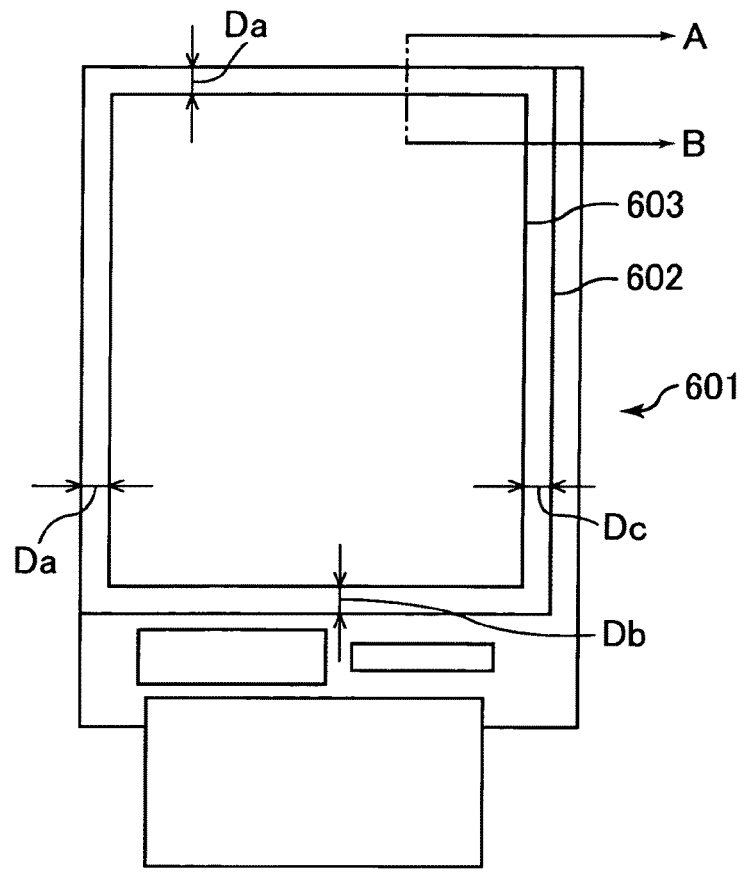
(b)
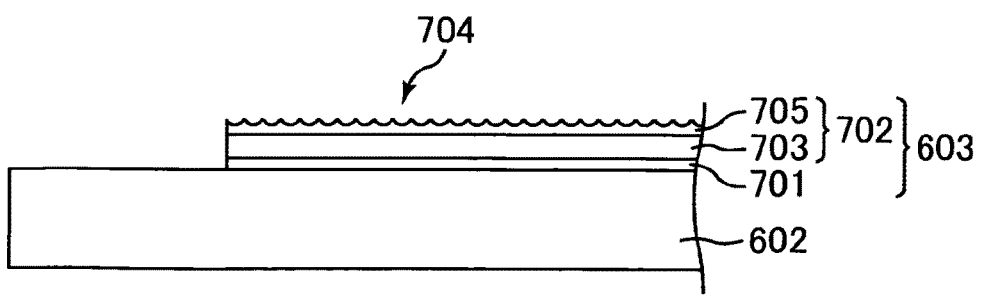

Fig. 11
(a)
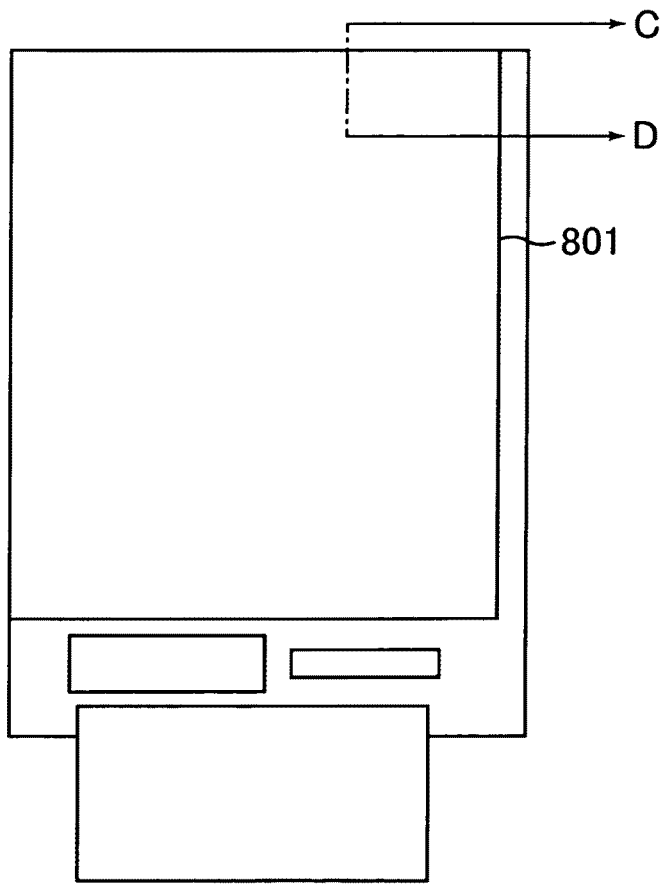
(b)
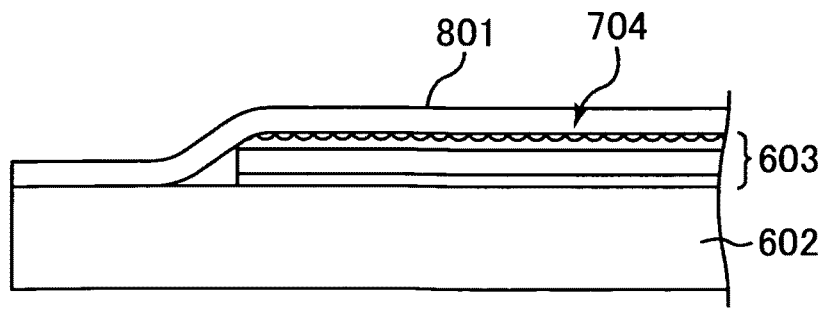

Fig. 12
(a)
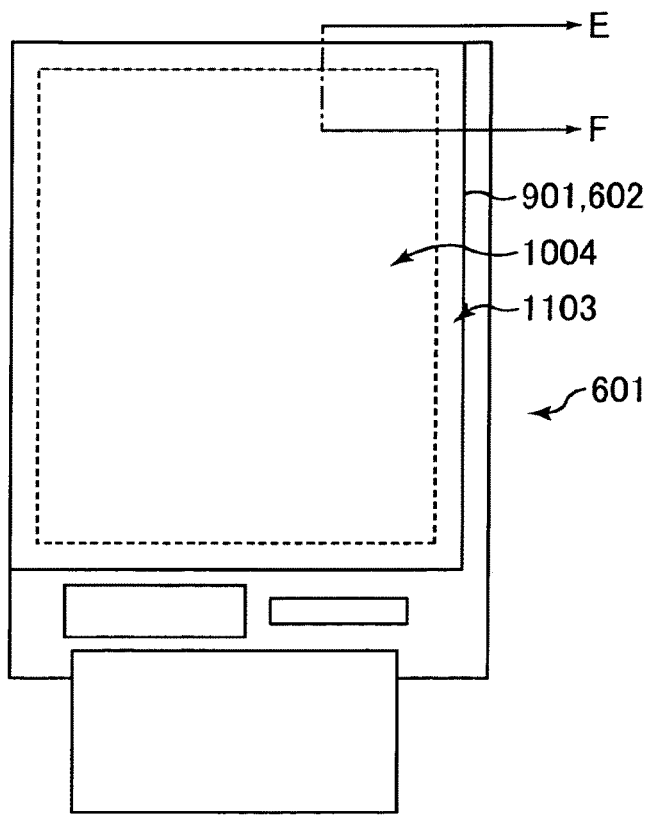
(b)
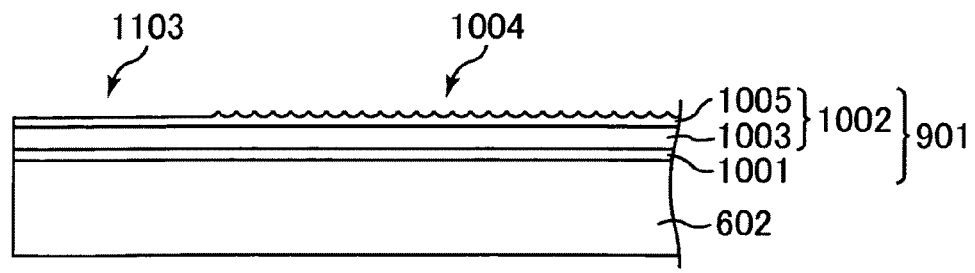

Fig. 13
(a)
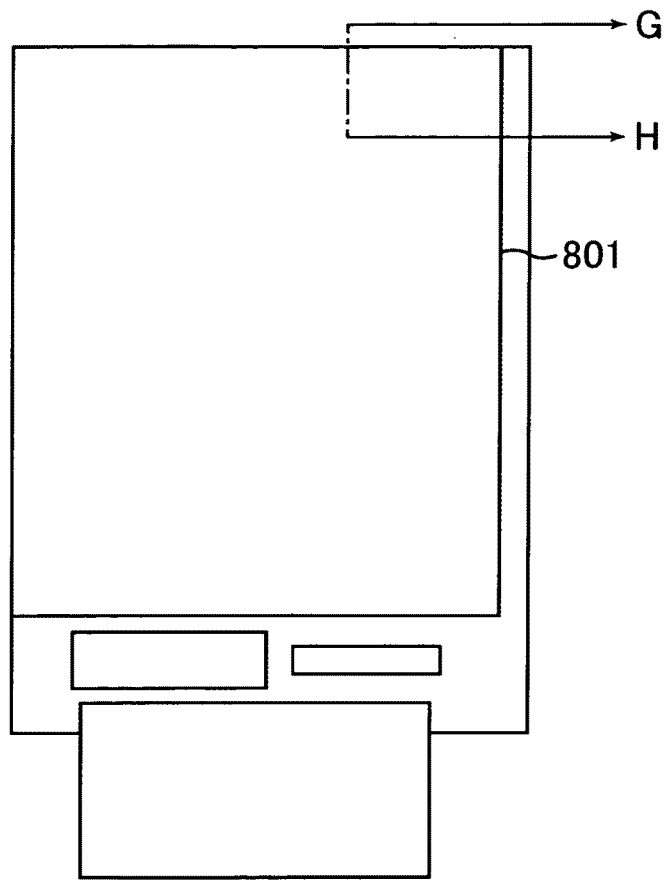
(b)
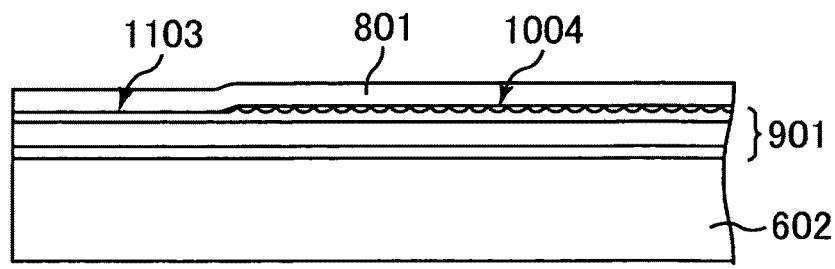

Fig. 14
(a)
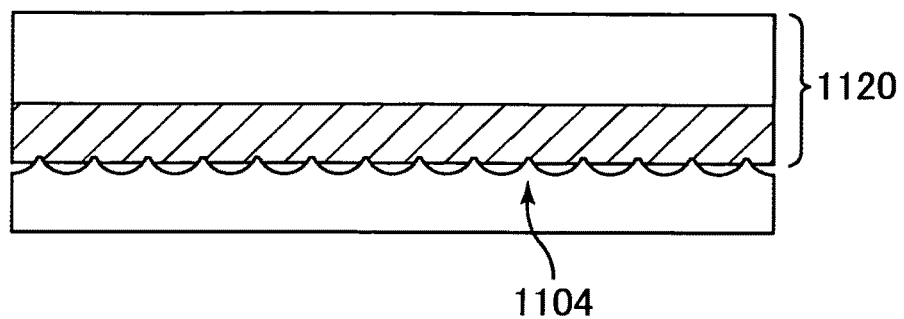
(b)
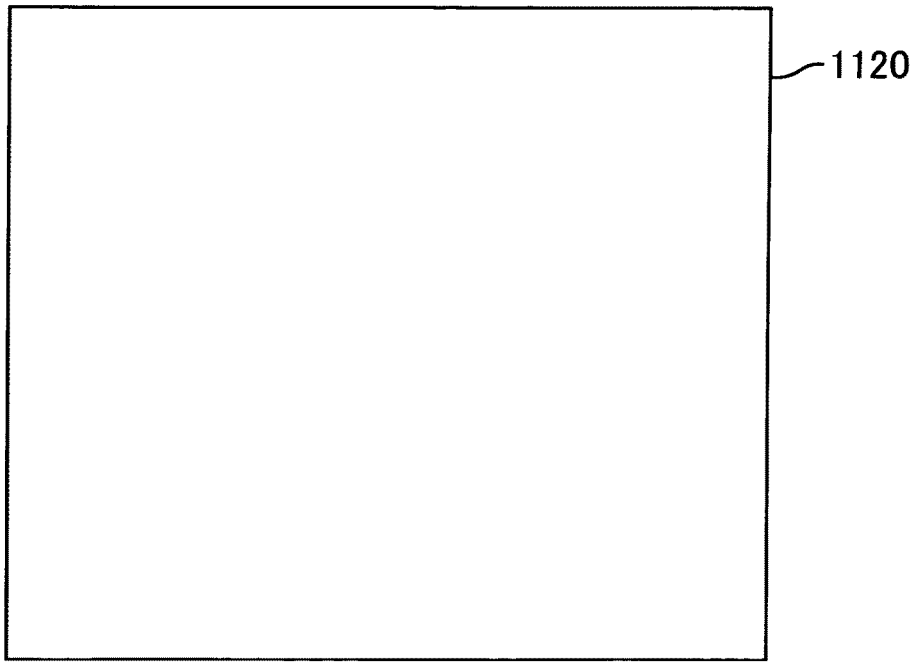

Fig. 15
(a)
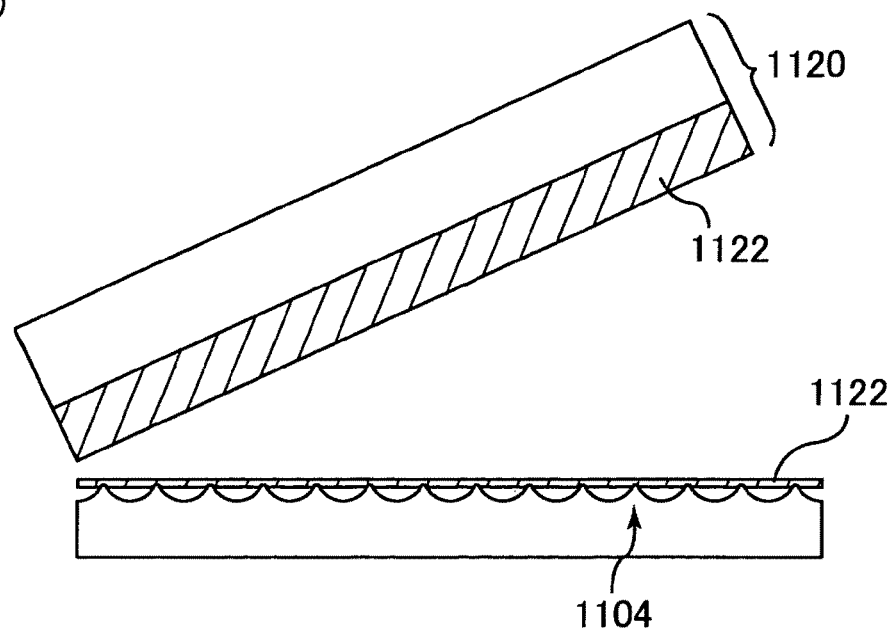
(b)
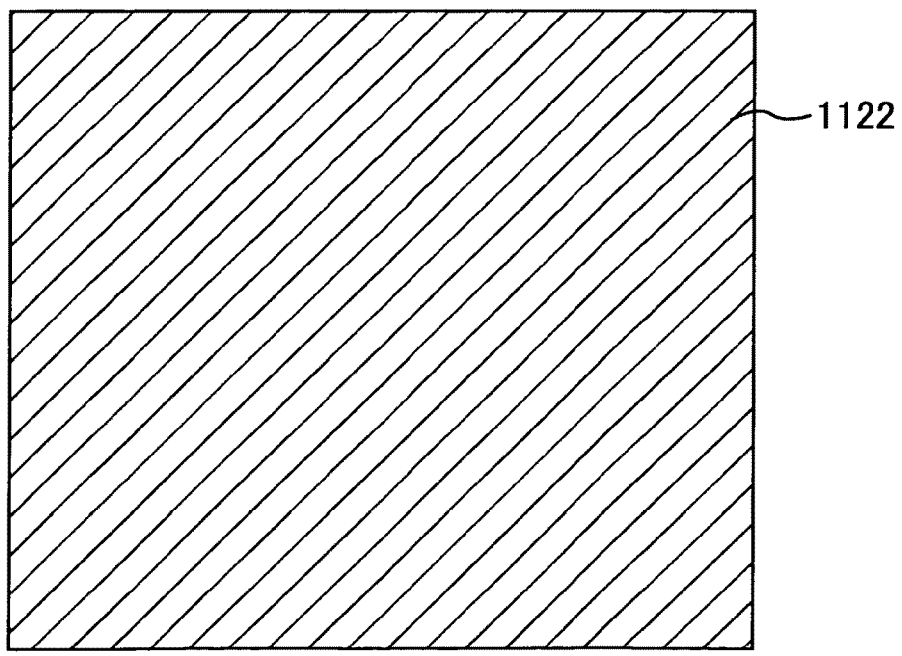

DISPLAY DEVICE AND OPTICAL FILM

TECHNICAL FIELD

The present invention relates to a display device and an optical film. More specifically, the present invention relates to a display device and an optical film which are suitable for an anti-reflection technique employing a moth-eye structure.

BACKGROUND ART

The outermost surface of flat panel displays (FPDs) such as liquid crystal displays (LCDs) and plasma panel displays (PDPs) are generally protected from cracks, stains and the like by a protective film until the displays are shipped. The components (e.g. polarizers for LCDs, glass plates for PDPs) which are to be used for the surfaces of FPDs generally have a protective film attached thereto when being handled in the production process and FPD assembling process thereof.

For those polarizers for LCDs, techniques have been disclosed which suppress generation of static electricity in the process of attaching a polarizer to a liquid crystal display element to reduce the damage to the liquid crystal panel. For example, Patent Document 1 teaches a polarizer which has a peelable separator on one side of a polarizer body through an adhesive, and is provided with a region (peel-off treatment region) which has a mold-releasing property on the adhesive side of the separator.

A known technique to prevent surface reflection in the optical material field is a "moth-eye structure" which is a kind of nanostructure.

Patent document 1: JP 10-54981 A

SUMMARY OF THE INVENTION

In the case of a polarizer or low-reflection film having the moth-eye structure provided for a low-reflection treatment on the outermost surface, the low-reflection treatment surface (surface having the moth-eye structure), when covered with a protective film, has a very small substantial contact area with the paste (adhesive) of the protective film because the moth-eye structure has very fine irregularities. For this reason, common protective films sometimes cannot maintain the adhesion, peeling off easily.

To prevent such a case, it is possible to use a protective film including a paste made of a different material to provide an increased adhesion (adhesive strength): that is, as illustrated in FIG. 14, a protective film 1120 having such an increased adhesive strength is attached to the moth-eye structure 1104 such that the adhesion between the protective film 1120 and the low-reflection film is increased. However, as illustrated in FIG. 15, the protective film 1120, when peeled off, sometimes leaves the paste component that constitutes an adhesive layer 1122 of the protective film 1120, on the surface of the moth-eye structure 1104, i.e., on the surface of the low-reflection surface, whereby the reflection properties can be deteriorated. The present inventors have found that such a protective film having an increased adhesive strength causes an increase in the reflectance of the low-reflection surface from 0.2% to about 1%, and also sometimes leaves traces at parts where the protective film has been attached.

To those polarizers or low-reflection films having the moth-eye structure, the technology of Patent Document 1 can be applied; even in that case, the trade-off between such adhesion levels is not solved that setting the adhesion of the paste to the region free of peeling treatment around the peeling treatment region to an ordinary level results in an insufficient adhesion, but increasing the adhesion of the paste generates residual paste.

The present invention has been made in view of the above state of the art, and aims to provide a display device and an optical film which can protect the moth-eye structure while maintaining low reflectance.

The present inventors have made various studies on display devices that can protect the moth-eye structure while maintaining low reflectance, and in the studies, the inventors have focused on the attachment position of the protective film. As a result, a protective film for covering the moth-eye structure, even if having low adhesive strength to the moth-eye structure, has appeared to be able to secure sufficient adhesive strength, in the case that the portion to which the protective film adheres includes a flat portion that is flatter than the moth-eye structure of the display device. The present inventors also found that, in this case, the protective film can be attached to the moth-eye structure while the paste (adhesive) of the protective film is prevented from remaining on the moth-eye structure. The present inventors thereby have solved the above problem admirably, completing the present invention.

That is, one aspect of the present invention is a display device comprising an anti-reflection film including a moth-eye structure and a peelable protective film, wherein the protective film covers the moth-eye structure and is attached to a flat portion of the display device, the flat portion being flatter than the moth-eye structure.

As long as the display device of the present invention essentially includes the above components, the display device is not particularly limited.

Hereinafter, preferable structures of the display device of the present invention will be described in detail.

The flat portion and the moth-eye structure are preferably disposed in substantially the same plane. Thereby, the protective film can be more easily arranged on the flat portion and the moth-eye structure at the same time.

The flat portion is suitably a substrate constituting a display panel and/or a region free of the moth-eye structure on the anti-reflection film. As above, the display device may further comprise a display panel including a substrate, wherein the flat portion may correspond to the substrate, or may correspond to a region free of the moth-eye structure on the anti-reflection film.

An entire peripheral portion of the protective film is preferably attached to the flat portion. Thereby, the protective film can be more firmly held in place while the moth-eye structure can be more effectively protected.

Another aspect of the present invention is an optical film comprising an anti-reflection film including a moth-eye structure and a peelable protective film, wherein the protective film covers the moth-eye structure and is attached to a flat portion of the anti-reflection film, the flat portion being flatter than the moth-eye structure.

In this case, even a protective film having low adhesive strength to the moth-eye structure can adhere to the flat portion with sufficient adhesive strength, and the protective film can be attached to the moth-eye structure while the paste (adhesive) of the protective film is prevented from remaining on the moth-eye structure. Therefore, the moth-eye structure can be protected while low reflectance is maintained.

As long as the optical film of the present invention essentially includes the above components, the optical film is not particularly limited.

Hereinafter, preferable structures of the optical film of the present invention will be described in detail below.

The flat portion preferably corresponds to a region free of the moth-eye structure on the anti-reflection film.

An entire peripheral portion of the protective film is preferably attached to the flat portion. Thereby, the moth-eye structure can be more effectively protected while the protective film can be more firmly held in place.

EFFECT OF THE INVENTION

The display device and the optical film according to the present invention can protect the moth-eye structure while maintaining low reflectance.

BRIEF DESCRIPTION OF DRAWINGS

FIG. 1 is a schematic view illustrating a display device of a first embodiment: FIG. 1(a) is a cross-sectional view thereof; and FIG. 1(b) is a plan view thereof.

FIG. 2 is a schematic view illustrating a state where a protective film for the display device of the first embodiment is peeled: FIG. 2(a) is a cross-sectional view thereof; and FIG. 2(b) is a plan view thereof.

FIG. 3 is a schematic view illustrating a display device of a second embodiment: FIG. 3(a) is a cross-sectional view thereof; and FIG. 3(b) is a plan view thereof.

FIG. 4 is a schematic view illustrating a state where a protective film for the display device of the second embodiment has been peeled off: FIG. 4(a) is a cross-sectional view thereof; and FIG. 4(b) is a plan view thereof.

FIG. 9 is a schematic view for explaining a method for measuring a peeling force: FIG. 9(a) is a cross-sectional view thereof; and FIG. 9(b) is a plan view thereof.

FIG. 10 is a schematic view illustrating a state where no protective film is provided to the liquid crystal display device of Example 1: FIG. 10(a) is a plan view thereof; and FIG. 10(b) is a cross-sectional view along the A-B line in FIG. 10(a).

FIG. 11 is a schematic view illustrating a state where a protective film is provided to the liquid crystal display device of Example 1: FIG. 11(a) is a plan view thereof; and FIG. 11(b) is a cross-sectional view along the C-D line in FIG. 11(a).

FIG. 12 is a schematic view illustrating a state where no protective film is provided to the liquid crystal display device of Example 2: FIG. 12(a) is a plan view thereof; and FIG. 12(b) is a cross-sectional view along the E-F line in FIG. 12(a).

FIG. 13 is a schematic view illustrating a state where a protective film is provided to the liquid crystal display device of Example 2: FIG. 13(a) is a plan view thereof; and FIG. 13(b) is a cross-sectional view along the G-H line in FIG. 13(a).

FIG. 14 is a schematic view illustrating a conventional display device: FIG. 14(a) is a cross-sectional view thereof; and FIG. 14(b) is a plan view thereof.

FIG. 15 is a schematic view illustrating a state where a protective film of a conventional display device has been peeled off: FIG. 15(a) is a cross-sectional view thereof: and FIG. 15(b) is a plan view thereof.

MODE(S) FOR CARRYING OUT THE INVENTION

Figure 5:
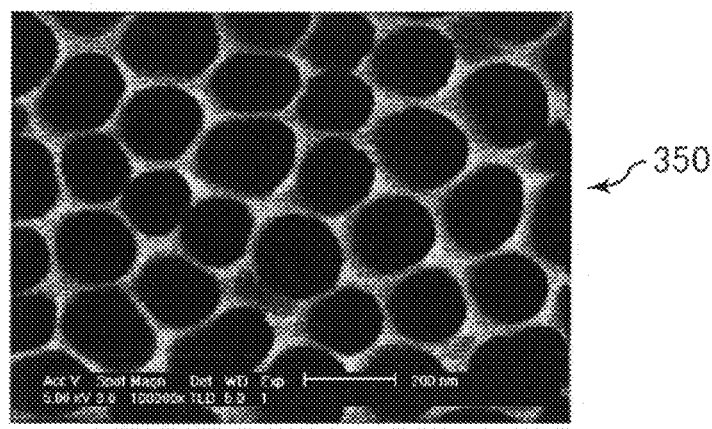
FIG. 5 is an electron microscope photograph showing a mold for forming the moth-eye structure.

The term "front" herein refers to the observer side of the display device. That is, the term "front surface" refers to the surface on the observer side.

Further, the phrase "the flat portion and the moth-eye structure are disposed in substantially the same plane" herein merely means that the flat portion and the moth-eye structure are disposed in similar planes that are the same to the extent that the protective film can be arranged on the flat portion and the moth-eye structure at the same time; and the peaks of the moth-eye structure and the surface of the flat portion may have a level difference (suitably a level difference of 0.5 mm or less in height, and more suitably a level difference of 0.2 mm or less in height).

Also, the thickness of a component referred to as a film is not particularly limited, and the film may be a sheet.

The present invention will be described in more detail with reference to drawings, based on the following embodiments which, however, are not intended to limit the scope of the present invention.

First Embodiment

The display device of the first embodiment, as illustrated in FIGS. 1(a) and 1(b), includes a display panel 30, an anti-reflection film 110 attached to the front surface of the display panel 30, and a protective film 20 peelably attached to the front surface of the anti-reflection film 110. More specifically, the anti-reflection film 110 is attached to a substrate (front surface substrate) on the front surface side of the display panel 30.

The moth-eye structure 111 is formed in the entire region of the front surface of the anti-reflection film 110. The anti-reflection film 110 is attached in such a manner to at least cover a display region of the display panel 30. The anti-reflection film 110 is smaller than the front surface substrate of the display panel 30, and is not provided at a frame-like peripheral portion located in a non-display region of the front surface substrate.

The moth-eye structure 111 is provided in such a manner to at least cover the display region of the display panel 30. Examples of the moth-eye structure 111 include ones that have a plurality of very fine irregularities on the surface of the anti-reflection film 110. The irregularities are preferably nanometric cone-shaped protrusions, and the pitch for the protrusions is suitably substantially 100 to 300 nm, and the height of the protrusions is suitably substantially 50 to 500 nm. Since such a moth-eye structure 111 has a refractive index that changes continuously from the air layer to the anti-reflection film 110, the moth-eye structure 111 does not function as an optical surface for the incident light; accordingly, the reflected light on the surface of the display device is greatly reduced. For example, the reflectance on the surface of the display device can be set to 0.1% or less.

The moth-eye structure 111 can be formed using the technique of nanoimprinting (UV nanoimprinting or heat imprinting), for example. More specifically, the moth-eye structure 111 can be formed by applying an ultraviolet-curable resin to the surface of a base film or a mold for moth-eye structures, pressing the surface of the base film having the ultraviolet-curable resin applied thereto to the mold, and in this state, curing the ultraviolet-curable resin by UV irradiation over the base film. Alternatively, the moth-eye structure 111 can be formed by applying a thermosetting resin to the surface of a base film or a mold for moth-eye structures, pressing the surface of the base film having the thermosetting resin applied thereto to the mold, and in this state, curing the thermosetting resin by heat.

As above, the anti-reflection film 110 having the moth-eye structure 111 is suitably a laminate of a base film containing TAC (triacetyl cellulose) or the like and a resin layer (moth-eye layer) that is arranged on the base film and has the moth-eye structure 111 on the surface. Thereby, the anti-reflection film 110 of the present embodiment can be mass-produced by the nanoimprinting, and the productivity of the display device of the present embodiment can be increased.

The mold is suitably an aluminum substrate having nanometric holes on the surface by anodization. More specifically, the peripheral surface of a columnar or tubular aluminum pipe produced by extrusion is first cut-polished. Then, a smooth aluminum surface (peripheral surface) of the obtained polished aluminum pipe is repeatedly anodized and etched several times (e.g. three times). Thereby, nanometric holes are produced on the surface. Such a method employing anodization can form almost uniform nanometric recessions randomly on the surface, and can also form a joint-free (seamless) nanostructure required for continuous production on the surface of the columnar or tubular molding roller. Therefore, the joint-free moth-eye structure 111 can be continuously transferred to a transcription film (e.g. ultraviolet-curable resin, thermosetting resin).

The protective film 20 has a base film 21 containing PET (polyethylene terephthalate) or the like and an adhesive layer 22 formed on one side of the base film 21, and is temporarily attached to the display device in such a manner to at least cover the moth-eye structure 111. In this way, the protective film 20 is temporarily attached to the display device to protect the moth-eye structure 111 until shipment.

The protective film 20 may be a common protective film that is used for display devices free of the moth-eye structure. The basic material of the protective film 20 may be a resin material such as acrylic resin. The adhesive layer 22 is formed by, for example, applying an adhesive to the base film 21 containing PET. Examples of the process and the technique to control the adhesion of the adhesive layer 22 include the following techniques (1) to (4).

(1) A technique of changing the thickness of the adhesive layer 22 (increasing the thickness enables to increase the adhesion).
(2) A technique of changing the molecular weight of resin constituting the adhesive layer 22 (increasing the amount of the low-molecular weight component enables to increase the adhesion).
(3) A technique of adding a cross-linking agent to the adhesive layer 22 and changing the mixing amount thereof (increasing the amount of the cross-linking agent enables to decrease the adhesion).
(4) A technique of causing shrinkage on curing of the adhesive layer 22 by UV irradiation, so as to produce stress that decreases the adhesion.

The protective film 20 covers the moth-eye structure 111, and is attached (adhered) to the flat portion 140 that is flatter than the moth-eye structure 111 of the display device. The flat portion 140 is the front surface substrate of the display panel 30, and the peripheral portion of the protective film 20 is adhered to the front surface substrate of the display panel 30.

Common protective films used for display devices free of moth-eye structures generally have insufficient adhesive strength to the moth-eye structure 111. Those common protective films still show sufficient adhesive strength to a common surface free of the moth-eye structure, including substrates such as a glass substrate and a plastic substrate, protective layers containing TAC or the like, and anti-reflection layers such as anti-glare (AG) layers, low-reflection (LR) layers, and anti-reflection (AR) layers.

That is, the protective film 20 can show sufficient adhesive strength to the flat front surface substrate of the display panel 30 as described above. Therefore, the protective film 20 can be held in place on the display device even if the display device has the moth-eye structure 111 on the surface thereof.

The protective film 20 may not adhere to the moth-eye structure 111 as long as the film 20 adheres to the flat portion 140. That is, the protective film 20 may be in contact with the moth-eye structure 111, or the protective film 20 may have low adhesive strength to the region with the moth-eye structure 111 formed therein (which almost corresponds to the display region), and thus the protective film 20 may be off the moth-eye structure 111. Therefore, as illustrated in FIGS. 2(a) and 2(b), part (adhesive, paste) of the adhesive layer 22 of the protective film 20 is effectively prevented from remaining on the moth-eye structure 111 even after the protective film 20 is peeled off. That is, an increase in the reflectance of the anti-reflection film 110 owing to the paste can be suppressed effectively.

Thus, the present embodiment enables to achieve holding of the protective film 20 in place and securement of the performance of the anti-reflection film 110 at the same time.

Here, the flat portion 140 is not particularly limited to the front surface substrate, and may be a bezel or a case. Preferably, the flat portion 140 and the moth-eye structure 111 are disposed in substantially the same plane. In this case, the protective film 20 can be easily arranged on the flat portion 140 and the moth-eye structure 111 at the same time.

The flatness of the flat portion 140 is not particularly limited, and the flat portion 140 preferably has flatness of the same level as components constituting the surface of common FPDs, such as substrates (e.g. glass substrates, plastic substrates), protective layers containing TAC or the like, and anti-reflection layers (e.g. AG layers, LR layers, AR layers).

The size of the protective film 20 is set to be one-size larger than that of the region in which the moth-eye structure 111 is formed. Such a size allows the entire peripheral portion (the entire perimeter) of the protective film 20 to be attached to the flat portion 140 free of the moth-eye structure 111. Therefore, the protective film 20 can be more firmly held in place and the moth-eye structure can be more effectively protected.

The protective film 20 preferably has adhesion of a level that does not leave the paste (adhesive) component of the adhesive layer 22 on the moth-eye structure 111 when the protective film 20 is peeled from the anti-reflection film 110. In this case, the paste component of the protective film 20 is more surely prevented from remaining on the moth-eye structure 111, and therefore the low reflectance to be provided by the moth-eye structure 111 can be more surely maintained. The adhesion of the protective film 20 can be appropriately adjusted by the above techniques (1) to (4).

Second Embodiment

Hereafter, a display device according to a second embodiment will be described. The components in the present embodiment which are the same as those in the first embodiment are designated by the same symbols to avoid the same description.

The display device of the second embodiment, as illustrated in FIGS. 3(a) and 3(b), includes the display panel 30, an anti-reflection film 210 attached to the front surface of the display panel 30, and the protective film 20 peelably attached to the front surface of the anti-reflection film 210. The anti-reflection film 210 is, more specifically, attached to a substrate on the front surface side (i.e., front surface substrate) of the display panel 30. An optical film comprising the anti-reflection film 210 and the protective film 20 is another aspect of the present embodiment.

The moth-eye structure 211 is formed on the front surface of the anti-reflection film 210. The anti-reflection film 210 is attached in such a manner to at least cover the display region of the display panel 30. The size of the anti-reflection film 210 is not limited as long as it is larger than the display region of the display panel 30 and smaller than the front surface substrate of the display panel 30. The anti-reflection film 110 may or may not be provided to the peripheral portion located in the non-display region of the front surface substrate.

The moth-eye structure 211 is provided in such a manner to at least cover the display region of the display panel 30. As above, the moth-eye structure 211 is the same as the moth-eye structure 111 in the first embodiment.

However, the anti-reflection film 210 has the flat portion 240 free of the moth-eye structure surrounding the moth-eye structure 211 on the front surface.

In order to form the flat portion 240 free of the moth-eye structure 211 on the anti-reflection film 210, a mold with desired regions masked may be used in the anodization process, for example. In this case, the moth-eye structure is not transferred to part of the transcription film (e.g., ultraviolet-curable resin, thermosetting resin) corresponding to the masked region so that a flat portion can be formed. The masking material for masking the mold may be an adhesive film produced by coating a film such as a polyethylene film and a polypropylene film with an adhesive. Examples of the method of leaving the masking material only in a desired region include a method of covering aluminum by photoresist or the like before the anodization process, and then performing the exposure and development processes. Such a method allows aluminum to be exposed in regions to be anodized.

As in the case of the first embodiment, the protective film 20 has the base film 21 and the adhesive layer 22, and is temporarily attached to the display device in such a manner to at least cover the moth-eye structure 211.

The protective film 20 covers the moth-eye structure 211, and is attached (adhered) to the flat portion 240 that is flatter than the moth-eye structure 211 of the display device. More specifically, the peripheral portion of the protective film 20 is adhered to the flat portion 240 free of the moth-eye structure.

Common protective films used for display devices free of the moth-eye structure generally have insufficient adhesive strength to the moth-eye structure 211. Those common protective films still show sufficient adhesive strength to a common surface free of the moth-eye structure, including substrates such as glass substrates and plastic substrates, protective layers containing TAC or the like, and anti-reflection layers such as anti-glare (AG) layers, low-reflection (LR) layers, and anti-reflection (AR) layers.

That is, the protective film 20 can show sufficient adhesion to the flat portion 240 free of the moth-eye structure on the anti-reflection film 210, as described above. Therefore, the protective film 20 can be held in place on the display device even if the display device has the moth-eye structure 211 on the surface thereof.

The protective film 20 may not adhere to the moth-eye structure 211 as long as the film 20 adheres to the flat portion 240. That is, the protective film 20 may be in contact with the moth-eye structure 211, or the protective film 20 may have low adhesive strength to the region with the moth-eye structure 211 formed therein (which almost corresponds to the display region), and thus the protective film 20 may be off the moth-eye structure 211. Therefore, as illustrated in FIGS. 4(a) and 4(b), part (adhesive, paste) of the adhesive layer 22 of the protective film 20 is effectively prevented from remaining on the moth-eye structure 211 even after the protective film 20 is peeled off. That is, an increase in the reflectance of the anti-reflection film 210 owing to the paste can be suppressed effectively.

Thus, the present embodiment enables to achieve holding of the protective film 20 in place and securement of the performance of the anti-reflection film 210 at the same time.

Preferably, from the same viewpoint in the first embodiment, the flat portion 240 and the moth-eye structure 211 are disposed in substantially the same plane.

The flatness of the flat portion 240 is not particularly limited, and the flat portion 240 preferably has flatness of the same level as components constituting the surface of common FPDs, such as substrates (e.g. glass substrates, plastic substrates), protective layers containing TAC or the like, and anti-reflection layers (e.g. AG layers, LR layers, AR layers).

The size of the protective film 20 is set to be one-size larger than that of the region in which the moth-eye structure 211 is formed. Such a size allows the entire peripheral portion (the entire perimeter) of the protective film 20 to be attached to the flat portion 240 free of the moth-eye structure 211. Therefore, the protective film 20 can be more firmly held in place and the moth-eye structure 211 can be more effectively protected.

The flat portion 240 may be formed at any position as long as it constitutes the anti-reflection film 210. Still, preferably, the moth-eye structure 211 is formed in such a manner to correspond to the display region of the display panel 30, and the flat portion 240 is formed in such a manner to correspond to the non-display region of the display panel 30, i.e., in the frame-like peripheral portion of the anti-reflection film 210. Such a structure enables to effectively achieve holding of the protective film 20 in place, protection of the moth-eye structure 211, and excellent display performance with an aid of the moth-eye structure 211 at the same time.

The protective film 20 preferably has adhesion of a level that does not leave the paste (adhesive) component of the adhesive layer 22 on the moth-eye structure 211 when the protective film 20 is peeled from the anti-reflection film 210. In this case, the paste component of the protective film 20 is more surely prevented from remaining on the moth-eye structure 211, and therefore the low reflectance to be provided by the moth-eye structure 211 can be more surely maintained. The adhesion of the protective film 20 can be appropriately adjusted by the above techniques (1) to (4).

As above, the first and second embodiments according to the present invention make it possible to protect the moth-eye structure while maintaining low reflectance.

Meanwhile, the technique taught in Patent Document 1 includes controlling the adhesion of the protector (separator) partially. In contrast, in the first and second embodiments, the surface condition of the protection target (anti-reflection film with the moth-eye structure) is controlled partially. The present embodiments therefore enable to achieve holding of the protective film in place and provision of the surface reflection performance (with no residual paste) of the anti-reflection film at the same time. More specifically, avoiding formation or arrangement of the moth-eye structure in the peripheral portion (non-display region) on the surface to be protected leads to an increase in the adhesion between the protective film and the display device.

The display device in the first and second embodiments is not particularly limited, and is preferably an FPD; particularly, LCDs, PDPs, organic EL displays, and the like displays are suitable examples.

The material of the front surface substrate of the display panel in the first and second embodiments may be any material as long as it is a material commonly used for FPDs. More specifically, the front surface substrate of the display panel may be, for example, a glass substrate, a plastic plate, or the like.

The anti-reflection film in the first and second embodiments has at least the moth-eye structure, and provides at least the anti-reflection function of the moth-eye structure. As above, the moth-eye structure can greatly reduce the surface reflection, and the anti-reflection film in the first and second embodiments of course is not required to completely prevent surface reflection. The anti-reflection film in the first and second embodiments may have a function other than the anti-reflection function of the moth-eye structure. For example, the anti-reflection film in the first and second embodiments may have a function as a polarizing plate such as a linearly polarizing plate and a circularly polarizing plate. To provide such a function, for example, a linearly polarizing plate or a circularly polarizing plate may be arranged on the display panel side of the base film.

The concept of above first embodiment and the concept of the second embodiment may be combined. That is, the protective film may be attached to both the region free of the moth-eye structure on the anti-reflection film and the components (e.g. front surface substrate) on the front surface of the display device.

Example 1

First, the results of various verification experiments are described.

<Structure with Fine Irregularities; Moth-Eye Structure>

A mold 350 for forming a moth-eye structure is produced by utilizing the phenomenon that anodization of an aluminum layer produces nanometric holes in the layer, as illustrated in FIG. 5.

Figure 6:
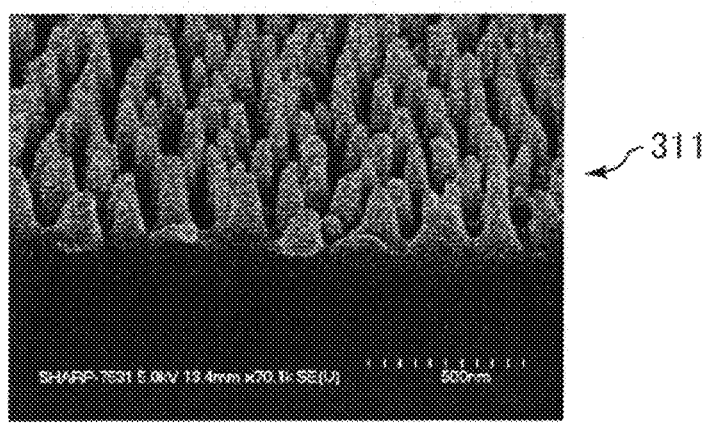
FIG. 6 is an electron microscope photograph (perspective view) illustrating the moth-eye structure formed using the mold.

The anti-reflection film in Example 1 has a moth-eye structure 311 on the surface thereof. The moth-eye structure 311 has fine irregularities, and as shown in FIG. 6, the fine irregularities include a plurality of fine protrusions arranged randomly at intervals that are shorter than the visible light wavelength. In the present example, the distance between the peaks of the adjacent protrusions in the moth-eye structure 311 is 250 nm or shorter.

Here, the result of the comparison between the reflectance of a conventional low-reflection treatment layer used in a polarizer for common LCDs and the reflectance of the anti-reflection film in Example 1. The conventional low-reflection treatment layer is a low-reflection treatment layer employing a light interference method, and is formed by applying a mixture of a binder resin and fine beads to a polarizing plate so as to form a resin layer having a low refractive index. The binder resin used here was an acrylic resin having a refractive index of substantially 1.5, and the beads used were hollow beads made of silicone. The refractive index of the beads was substantially 1.25, and the diameter of each bead was substantially 80 nm. The average refractive index in the resin layer of a low refractive index was substantially 1.3.

Figure 7:
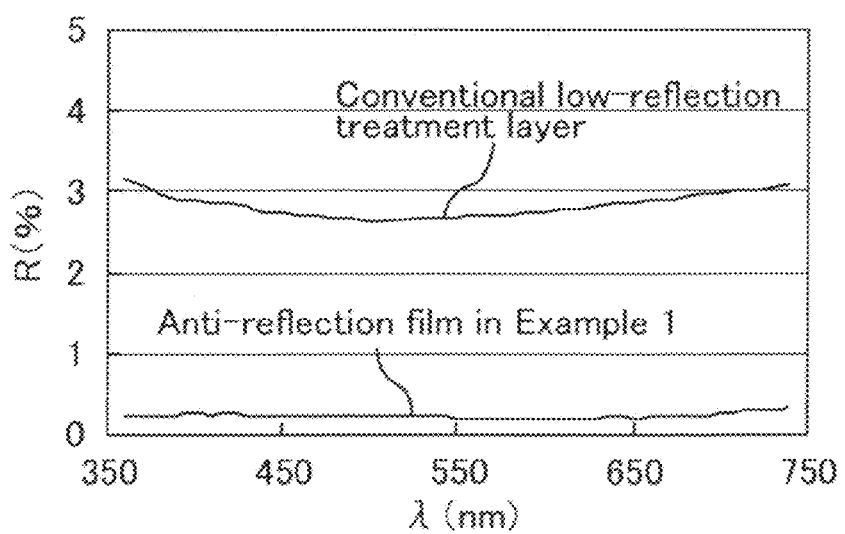
FIG. 7 shows the reflectance of the anti-reflection film in Example 1 and the reflectance of a conventional low-reflection treatment layer used for common polarizers for LCDs.

As shown in FIG. 7, the reflectance (surface reflectance) R of the conventional low-reflection treatment layer was substantially 2.8 to 3% whereas the reflectance R of the anti-reflection film (moth-eye structure 311) in Example 1 was substantially 0.2% in the entire visible light range. These values show that the anti-reflection method employing the moth-eye structure is a highly efficient low-reflection treatment.

The moth-eye structure, however, generally has an increased reflectance if a foreign matter or a thin film adheres to the surface thereof. Also, the anti-reflection function of the moth-eye structure is highly efficient compared to the conventional low-reflection treatment. Therefore, even a small increase in the reflectance will be noticeable. That is, if the moth-eye structure is covered with the protective film and the paste component of the protective film is transferred to the moth-eye structure, the increase in the reflectance is sometimes observed by eye, as stains forming patchy patterns.

The moth-eye structure includes very fine irregularities. Hence, when covering the moth-eye structure with a protective film, the contact area of the paste of the protective film and the moth-eye structure is very small. It is therefore usually difficult to hold a protective film in place on the moth-eye structure.

<Definition of Reflectance>

Figure 8:
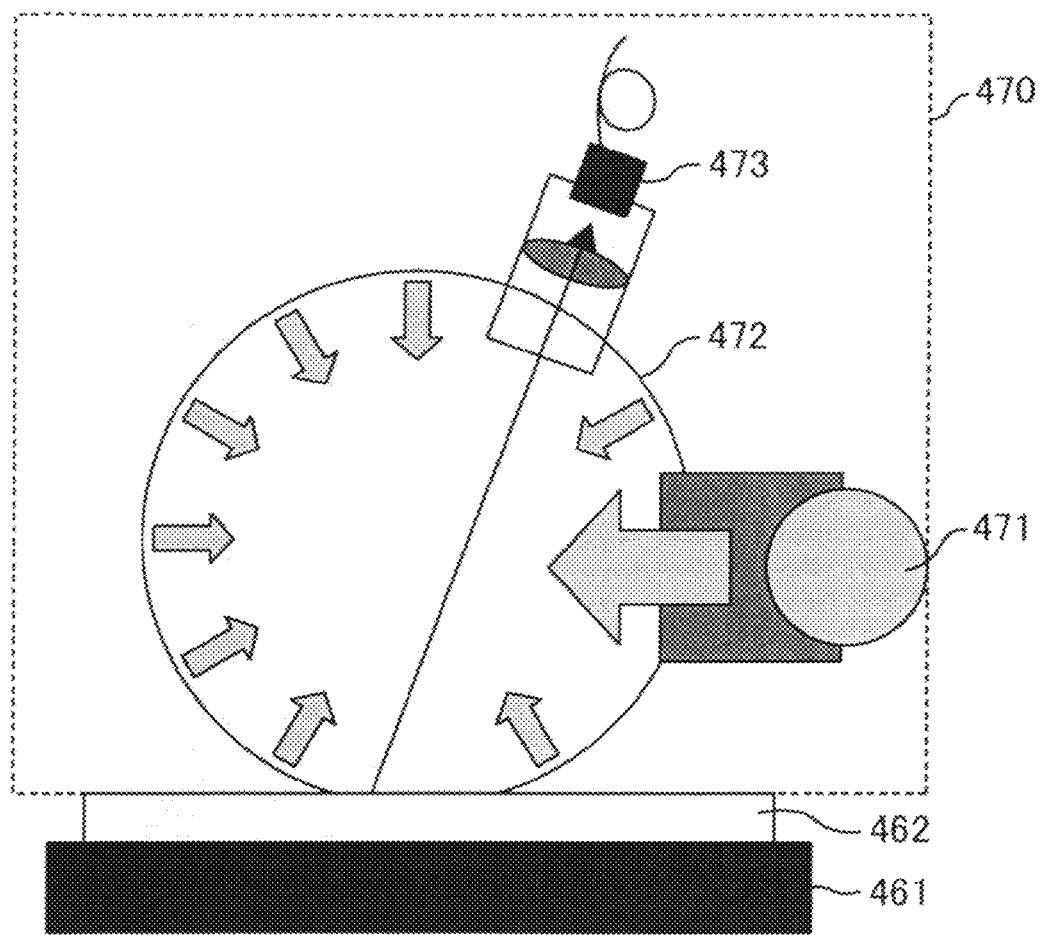
FIG. 8 is a view for explaining a method for measuring a reflectance, and is a schematic cross-sectional view illustrating a reflectance measuring device.

In the present example, the reflectance of the surface with a low-reflection treatment performed thereon was evaluated using the following criteria. The reflectance R (%) was measured, as illustrated in FIG. 8, by attaching a polarizer having a conventional low-reflection treatment layer formed thereon or an anti-reflection film 462 in Example 1 to a black acrylic plate 461 (SUMIPEX E produced by Sumitomo Chemical Co., Ltd.), and then setting the mode of an integration reflectance measuring device 470 (CM-2006 produced by Konica Minolta Holdings. Inc.) to SCI. The integration reflectance measuring device 470 is provided with an integrating sphere 472, a light source 471, and a detector 473. The value measured as the reflectance R includes a direct reflection component.

The change $\Delta R$ (%) in the reflectance was determined from a change (difference) in the reflectance of the surface of the conventional low-reflection treatment layer or the surface of the moth-eye structure 311 formed on the anti-reflection film in Example 1. More specifically, the change is determined from the reflectance of the surface upon IPA (isopropyl alcohol) cleaning and the reflectance of the surface upon peeling of a protective film attached thereto for three days. Table 1 shows the results.

Here, a first protective film (hereinafter referred to as a high-adhesion protective film) and a second protective film having lower adhesion than the strongly adhering protective film (hereinafter the second film is referred to as a low-adhesion protective film) were used as the protective film. The low-adhesion protective film was newly prepared for the measurement here. The first protective film and the second protective film were formed from an acrylic resin, and the adhesion of the first protective film and the second protective film were appropriately adjusted by the above methods (1) to (4).

TABLE 1

|  | High-adhesion protective film | Low-adhesion protective film |
| --- | --- | --- |
| Conventional anti-reflection treatment layer | ±0% | ±0% |
| Anti-reflection film in Example 1 | ±0.5% | ±0% |

Table 1 shows that the reflectance of the conventional low-reflection treatment layer did not change regardless of the protective film used.

In contrast, the high-adhesion protective film attached to the surface of the moth-eye structure 311 left the paste thereof on the moth-eye structure 311 when peeled off, and thus caused an increase in the reflectance. Also, after the peeling, the high-adhesion protective film left marks which were observed as stains forming patchy patterns.

The low-adhesion protective film attached to the surface of the moth-eye structure 311, however, did not case an increase in the reflectance, nor did the film leave marks thereof after peeling. However, the combination of the low-adhesion protective film and the moth-eye structure 311 showed a very low peeling strength for separating them, which did not allow the low-adhesion protective film to be held in place on the moth-eye structure. The evaluation results of the peeling strength are shown below.

<Definition of Peeling Strength>

In the present example, the peeling strength of the protective film was evaluated using the following criteria.

First, the protective film 320 (high-adhesion protective film or low-adhesion protective film) was cut into a 2.5 cm-wide tape shape. As illustrated in FIG. 9(b), the cut film was attached to an adherend surface 580 (surface of conventional low-reflection treatment layer or surface of moth-eye structure formed on anti-reflection film in Example 1). Then, the force of peeling was measured while an end of the protective film 320 was pulled upward (in the direction at 180° from the adherend surface 580), as illustrated in FIG. 9(a). Table 2 shows the results thereof.

TABLE 2

|  | High-adhesion protective film | Low-adhesion protective film |
| --- | --- | --- |
| Conventional anti-reflection treatment layer | 2.7 N/25 mm | 0.15 N/25 mm |
| Anti-reflection film in Example 1 | 0.05 N/25 mm | 0 N/25 mm |

As a result, the peeling strength between the low-adhesion protective film and the moth-eye structure 311 was 0N. They did not adhere to each other at all, and the low-adhesion protective film could not be held in place on the surface of the moth-eye structure 311.

Meanwhile, sufficient adhesion to hold the high-adhesion protective film or the low-adhesion protective film was secured between the surface of the conventional low-reflection treatment layer and the high-adhesion protective film or the low-adhesion protective film.

As above, the surface of the moth-eye structure 311 tended to have stains due to the residual paste in the case of the high-adhesion protective film, and could not hold the film in place in the case of the low-adhesion protective film.

The liquid crystal display device of Example 1 includes a liquid crystal panel 601 and a moth-eye polarizer 603 as illustrated in FIGS. 10(a) and 10(b). The liquid crystal panel 601 has a front surface glass substrate (front surface glass plate) 602. The moth-eye polarizer 603 is arranged on (attached to) the front surface of the front surface glass plate 602.

The moth-eye polarizer 603 is provided with the anti-reflection function based on the moth-eye method and polarizing function, and thus functions as both an anti-reflection film and a polarizer. More specifically, the moth-eye polarizer 603 has a polarizer 701 having a thickness of substantially 180 μm and providing a polarizing function, and a low-reflection surface treatment layer 702 laminated on (attached to) the front surface of the polarizer 701.

The low-reflection surface treatment layer 702 shows an anti-reflection function based on the moth-eye method, and has a base film 703 including a TAC film having a thickness of 80 μm, and a moth-eye layer 705 formed on the front surface of the base film 703. The surface free of the moth-eye layer 705 on the base film 703 is attached to the front surface of the polarizer 701. The moth-eye structure 704 is formed on (transferred to) the front surface of the moth-eye layer 705. The moth-eye layer 705 is formed from an acrylic resin, and the thickness of the moth-eye layer 705 (height to the peaks of the protrusions of the moth-eye structure) is substantially 10 μm. Here, the size of irregularities of the moth-eye structure 704 is the same as that illustrated in FIG. 6.

The size of the front surface glass plate 602 was 58 mm×45.5 mm. The moth-eye polarizer 603 covered the display region of the liquid crystal panel 601, and was one size smaller than the front surface glass plate 602. Specifically, the size of the moth-eye polarizer 603 (polarizer 701 and low-reflection surface treatment layer 702) was 54 mm×40.5 mm.

At this time, the space between the edge of the moth-eye polarizer 603 and the edge of the front surface glass plate 602 was: space on the upper side Da=2.5 mm; space on the lower side Db=2.5 mm; space on the right side Dc=2 mm; and space on the left side Dd=2 mm.

Next, as illustrated in FIGS. 11(a) and 11(b), a protective film 801 was attached to the liquid crystal panel 601 so as to cover the front surface glass plate 602. The protective film 801 used was a low-adhesion protective film (protective film having a peeling strength of 0.15 N/25 mm to the conventional low-reflection treatment layer) used in the above verification experiment. The size of the protective film 801 was 58 mm×45.5 mm, which was the same as the size of the front surface glass plate 602.

In such a structure, the protective film 801 adhered to the space between the edge of the moth-eye polarizer 603 and the edge of the front glass plate 602, i.e., the area free of the moth-eye structure 704. Therefore, the protective film 801 was able to be held in place on the moth-eye polarizer 603. Also, since the low-adhesion protective film employs a weak adhesive (suitably 0.15 N/25 mm to the conventional low-reflection treatment layer), no transfer of the paste occurred in the interface between the protective film 801 and the moth-eye structure 704, and thus the reflectance did not increase.

Example 2

Hereafter, a display device of Example 2 will be described. The components in the present example which are the same as the components in Example 1 are designated by the same symbols to avoid the same description.

The liquid crystal display device of Example 2 includes the same liquid crystal panel 601 as that in Example 1, and a moth-eye polarizer 903, as illustrated in FIGS. 12(a) and 12(b). The moth-eye polarizer 901 is arranged on (attached to) the front surface of the front surface glass plate 602 of the liquid crystal panel 601.

The moth-eye polarizer 901 is provided with the anti-reflection function based on the moth-eye method and polarizing function, and thus functions as both an anti-reflection film and a polarizer. More specifically, the moth-eye polarizer 901 has a polarizer 1001 having a thickness of substantially 150 μm and providing a polarizing function, and a low-reflection surface treatment layer 1002 laminated on (attached to) the front surface of the polarizer 1001.

The low-reflection surface treatment layer 1002 shows an anti-reflection function based on the moth-eye method, and has a base film 1003 including a TAC film having a thickness of 80 μm, and a moth-eye layer 1005 formed on the front surface of the base film 1003. The surface free of the moth-eye layer 1005 on the base film 1003 is attached to the front surface of the polarizer 1001. The moth-eye structure 1004 is formed on (transferred to) the front side surface of the moth-eye layer 1005. The moth-eye layer 1005 is formed from an acrylic resin, and the thickness of the moth-eye layer 1005 (height to the peaks of the protrusions of the moth-eye structure) is substantially 10 μm. Here, the size of irregularities of the moth-eye structure 1004 is the same as that illustrated in FIG. 6.

The size of the moth-eye polarizer 901 (polarizer 1001 and low-reflection surface treatment layer 1002) was 58 mm×45.5 mm, which was the same as the size of the front surface glass plate 602. However, the moth-eye structure 1004 is formed only in the display region of the liquid crystal panel 601, and the frame-like peripheral portion of the moth-eye layer 1005 (moth-eye polarizer 901) includes a flat portion 1103 having a width of substantially 2 mm and being free of the moth-eye structure 1004.

The flat portion 1103 in which the moth-eye structure 1004 is not formed can be formed by masking a desired area of the aluminum layer in the anodization process for producing the mold 350 illustrated in FIG. 5.

Next, as illustrated in FIGS. 13(*a*) and 13(*b*), the protective film 801 was attached to the liquid crystal panel 601 in such a manner to cover the moth-eye polarizer 901. The protective film 801 used was a low-adhesion protective film (protective film having a peeling strength of 0.15 N/25 mm to the conventional low-reflection treatment layer) used in the above verification experiment. The size of the protective film 801 was 58 mm×45.5 mm, which was the same as the size of the front surface glass plate 602.

In such a structure, the protective film 801 adhered to the flat portion 1103 in which the moth-eye structure 1004 was not formed. Therefore, the protective film 801 was able to be held in place on the moth-eye structure 1004. Also, since the low-adhesion protective film employs a weak adhesive (suitably 0.15 N/25 mm to the conventional low-reflection treatment layer), no transfer of the paste occurred in the interface between the protective film 801 and the moth-eye structure 1004, and thus the reflectance did not increase.

The present application claims priority to Patent Application No. 2009-083202 filed in Japan on Mar. 30, 2009 under the Paris Convention and provisions of national law in a designated State, the entire contents of which are hereby incorporated by reference.

EXPLANATION OF SYMBOLS

| | |
|---|---|
| 20, 320, 801, 1120: | Protective film |
| 21, 703, 1003: | Base film |
| 22, 1122: | Adhesive layer |
| 30: | Display panel |

-continued

EXPLANATION OF SYMBOLS

| | |
|---|---|
| 110, 210: | Anti-reflection film |
| 111, 211, 311, 704, 1004, 1104: | Moth-eye structure |
| 140, 240, 1103: | Flat portion |
| 350: | Mold |
| 461: | Acrylic plate |
| 462: | Polarizer having conventional low-reflection treatment layer or anti-reflection film in Example 1 |
| 470: | Integration reflectance measuring device |
| 471: | Light source |
| 472: | Integrating sphere |
| 473: | Detector |
| 580: | Adherend surface |
| 601: | Liquid crystal panel |
| 602: | Front surface glass plate |
| 603, 901: | Moth-eye polarizer |
| 701, 1001: | Polarizer |
| 702, 1002: | Moth-eye low-reflection surface treatment layer |
| 705, 1005: | Moth-eye layer |

The invention claimed is:

1. A display device comprising:
a display panel having a flat portion;
an anti-reflection film provided on the display panel and including a portion with a moth-eye structure; and
a protective film,
wherein
the protective film covers the moth-eye structure and is attached to the flat portion of the display panel, the flat portion being flatter than the moth-eye structure,
the protective film is peelably attached to the anti-reflection film,
the portion with the moth-eye structure substantially corresponds to a display region of the display device, and
the protective film has a relatively lower adhesive strength to the portion with the moth-eye structure than to the flat portion.

2. The display device according to claim 1,
wherein the flat portion and the moth-eye structure are disposed in substantially the same plane.

3. The display device according to claim 1, wherein
the display panel includes a substrate, and
the flat portion corresponds to the substrate.

4. The display device according to claim 1,
wherein the flat portion corresponds to a region free of the moth-eye structure on the anti-reflection film.

5. The display device according to claim 1,
wherein an entire peripheral portion of the protective film is attached to the flat portion.

6. An optical film comprising:
an anti-reflection film including a portion with a moth-eye structure; and
a protective film,
wherein
the protective film covers the moth-eye structure and is attached to a flat portion of the anti-reflection film, the flat portion being flatter than the moth-eye structure,
the protective film is peelably attached to the anti-reflection film, and
the protective film has a relatively lower adhesive strength to the portion with the moth-eye structure than to the flat portion, and
the flat portion is provided on an entire peripheral portion of the anti-reflection film.

7. The optical film according to claim 6,
wherein the flat portion corresponds to a region free of the moth-eye structure.

* * * * *